[19] United States Patent
Schmidt

[11] Patent Number: 4,626,905
[45] Date of Patent: Dec. 2, 1986

[54] PANORAMIC VIEW APPARATUS
[75] Inventor: Horst Schmidt, Wetzlar, Fed. Rep. of Germany
[73] Assignee: Ernst Leitz Wetzlar GmbH, Wetzlar, Fed. Rep. of Germany
[21] Appl. No.: 629,600
[22] Filed: Jul. 11, 1984
[30] Foreign Application Priority Data
Jul. 26, 1983 [DE] Fed. Rep. of Germany ....... 3326904
[51] Int. Cl.⁴ .................. H04N 7/18; H04N 5/225; H04N 5/33
[52] U.S. Cl. .................................. 358/87; 350/538; 358/113; 358/225; 358/226; 358/229
[58] Field of Search .............. 358/87, 113, 225, 226, 358/229; 350/538, 557

[56] References Cited
U.S. PATENT DOCUMENTS

| 4,086,616 | 4/1978 | Catano | 358/113 |
| 4,237,492 | 12/1980 | Roth | 358/113 |
| 4,260,217 | 4/1981 | Traeger | 350/538 |
| 4,504,143 | 3/1985 | Heinze | 350/557 |

FOREIGN PATENT DOCUMENTS 0065457 11/1982 European Pat. Off. .
1089546 11/1967 United Kingdom .
1367579 9/1974 United Kingdom .

Primary Examiner—Howard W. Britton
Attorney, Agent, or Firm—Schwartz, Jeffery, Schwaab, Mack, Blumenthal & Evans

[57] ABSTRACT

A panoramic view apparatus comprising a tube, a lookout mirror supported in the tube and movable in elevation and azimuth, and a closure window that is at least bispectrally transparent. In the tube, at least three known types of different optical measuring and observation devices are arranged adjacent each other, and means are provided to guide the output and input radiation for these measuring and observation devices coaxially through the closure window. It is possible to superpose upon each other the images from measuring and observation devices operating through different physical effects.

9 Claims, 3 Drawing Figures

PANORAMIC VIEW APPARATUS

BACKGROUND OF THE INVENTION

This invention relates to a panoramic view apparatus with a lookout mirror that is movable in elevation and azimuth and with a closure window that is at least bispectrally transparent.

Devices of this type are necessary to be able, for example in vehicles, to make observations, target sightings and distance measurements by day or night, or under certain atmospheric conditions, independently of the prevailing situation and conditions.

For this purpose DE-PS No. 26 56 873 discloses a vehicle periscope with a beam path for direct visual observation and with a device for attaching an image amplifier. In this periscope, devices are provided for the insertion of a dichroitic mirror from the front of which light from a laser emitter for distance measurements is directed onto objects to be observed and the light reflected from the object is directed onto a receiver. Furthermore, means are provided for insertion of a triple mirror which brings the image of a graticule to the observer via the rear side of said dichroitic mirror.

This periscope has the disadvantage that observation and measuring processes can only be effected in succession.

DE-PS No. 22 32 516 discloses an instrument in which a closure window is provided for the incoming radiation, said window being transparent in two concentric surface portions for two different spectral ranges. Both radiations have a common optical axis until they strike separate elevation mirrors associated with each of them.

This is disadvantageous in that two separate elevation mirrors must be present and aligned.

DE-OS No. 27 46 076 describes a panoramic periscope with selective daylight and thermal optics in which a closure window transparent for two spectral ranges is provided for the incoming radiation and in which a single lookout mirror that is movable in elevation and azimuth directs the incident radiation onto the thermal imaging system as well as onto the daylight optics.

The disadvantage of these panoramic devices is that separate beam paths are used for the individual observation and measuring units contained therein. Furthermore, during panoramic viewing the images rotate on the receiving parts of the opto-electrical devices, resulting in irrelations.

SUMMARY OF THE INVENTION

It is the object of the present invention to provide a panoramic view apparatus wherein the beam paths of all the associated optical measuring and observation devices are conducted in a common beam path over a common lookout mirror.

Another object of the present invention is to provide a panoramic view apparatus wherein the respective receiving parts of the measuring and observation devices are struck by upright and laterally correct object images.

A further object of the invention is to provide a panoramic view apparatus with which observation and measuring operations can be carried out simultaneously.

These and other objects of the invention are achieved by providing a panoramic view apparatus comprising a tube, a lookout mirror located in said tube and movable in elevation and azimuth, a bispectrally transparent closure window, at least three different measuring and observation devices arranged adjacent each other in said tube, and means for directing the output and input radiation for the measuring and observation devices parallelly (including coaxially) through said closure window.

The object of the invention is thus attained by providing a panoramic apparatus in which at least three different known types of measuring and observation devices are arranged adjacent each other in a tube, and means are provided in the tube to direct the output and input radiation for the respective measuring and observation devices parallelly and/or coaxially through the closure window and from it to the observation devices.

In one preferred embodiment of the apparatus, at least one of the observation devices operates opto-electronically, and means are provided to assure that upright and laterally correct images of the object to be measured are projected onto the receiving part of the observation device independently of the azimuthal position of the closure window.

BRIEF DESCRIPTION OF THE DRAWINGS

In the drawings a representative embodiment of the apparatus of the invention is schematically illustrated.

DETAILED DESCRIPTION OF A PREFERRED EMBODIMENT

Figure 1:
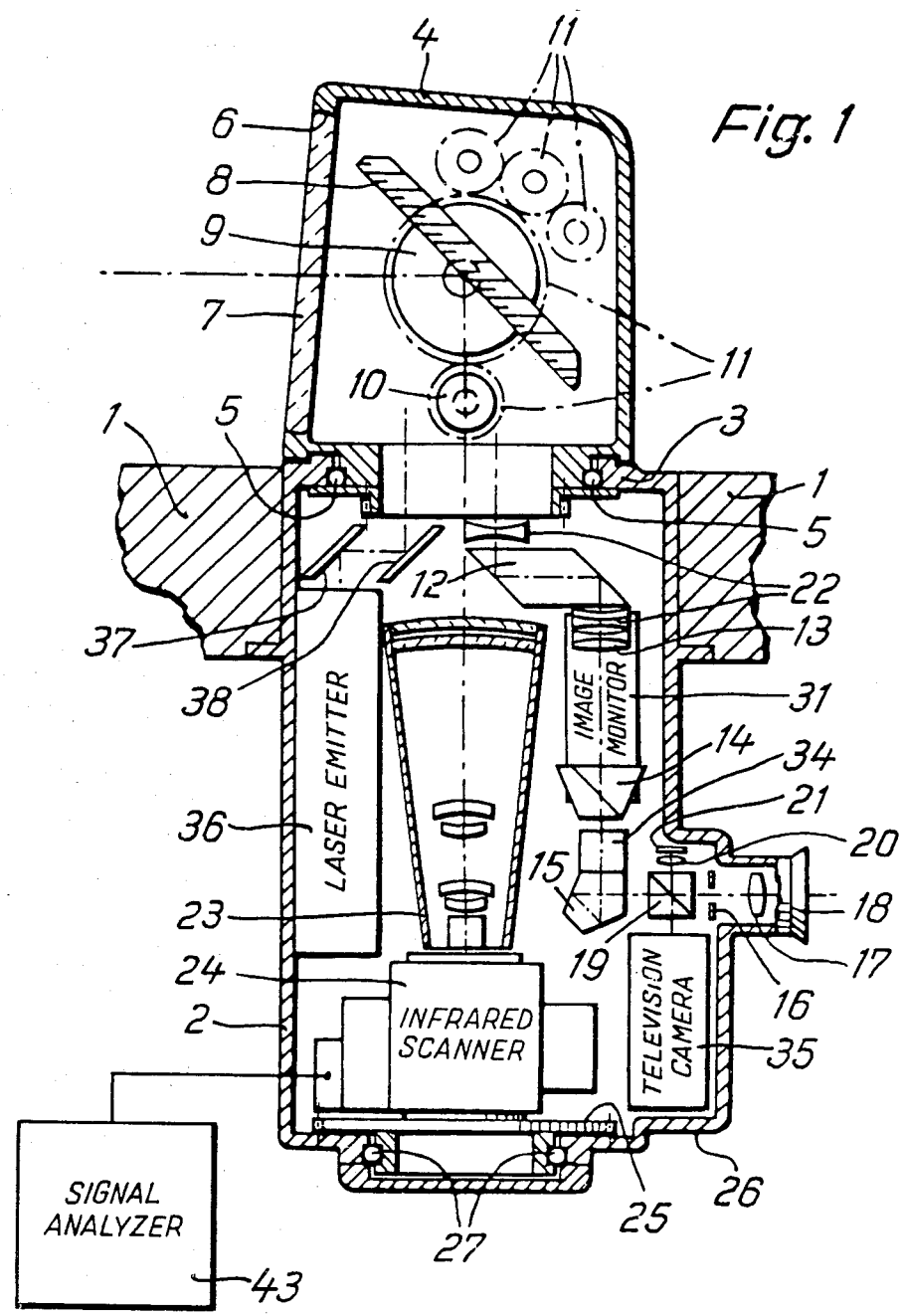
FIG. 1 shows the panoramic view device of the invention in a sectional side elevation.

In FIG. 1 a supporting wall 1, for example that of a vehicle, is indicated, with a tube 2 being fixedly attached to it. The end 3 of the tube 2 located above the supporting wall 1 contains an upright panoramic head 4, which while bearingly supported on balls 5, may be rotated through 360°.

The panoramic head 4 has a window opening 6, closed off by a bi-spectrally transparent disk 7. Behind the closure window 6 a lookout mirror 8 is located, which is arranged on rotary disks 9 to facilitate adjustment of its angle of elevation. The rotary disks 9 are driven by means of motors 10 and clutch elements 11.

A daylight visual observation device is arranged in the tube 2, comprising a swivelling prism 12, an objective lens 13, an erecting prism 14, a pentagonal prism 15, a diaphragm 16 and an ocular lens 17. The image of the object to be observed, which falls on the lookout mirror and is projected by the daylight device, may be viewed through an eyepiece or observation tube 18 in the tube 2.

A beam divider 19 is additionally arranged in the beam path of the daylight device. Beam divider 19 is associated with a lens 20, and it mirrors a reference scale 21 into the object image projected by the daylight device.

In order to obtain differently enlarged images of the object to be observed, an adapter element 22, which may be selectively switched into the beam path of the daylight device, is also mounted in the tube 2.

To observe objects in the dark and under analogous atmospheric conditions, the panoramic view apparatus is equipped with a thermal imaging device. In the illustrative embodiment shown, this device comprises an IR telescope 23 and an IR scanner system 24, which converts the radiation incident through the lookout mirror 8 and the IR telescope 23 into a visible image.

Figure 3:
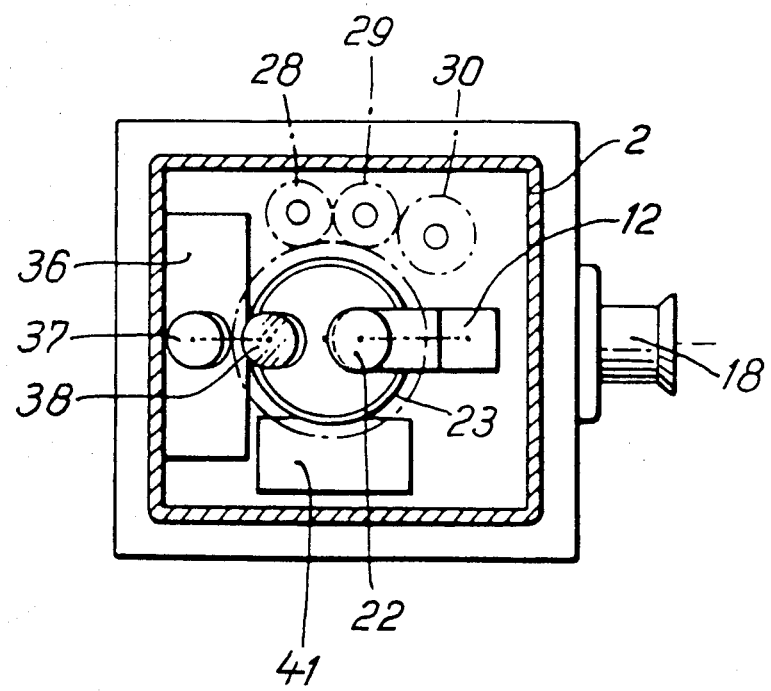
FIG. 3 is a sectional top view.

In order to assure the images of the object to be observed impinging on the receiving part 24 are upright and laterally correct with reference to a direct visual image, regardless of the azimuthal position of the closure window 6, the receiving part 24 is mounted on a rotating table 25, which is supported on rollers 27 in the lower end 26 of the tube 2 and is drivingly connected by means of clutch elements 28 and 29 with the panoramic head 4 rotatably mounted at the other end 3 of the tube 2 (FIG. 3). A motor (30) is provided to drive the common azimuthal rotation of the panoramic head 4 and the receiving part 24 (FIG. 3).

With the panoramic view apparatus of the invention, it is possible to view the thermal image of IR scanner system 24 through the ocular lens 17. For this purpose, a small monitor 31 is arranged in the tube 2 (shown offset in FIG. 1) to which the electrical image signals produced by the receiving part 24 are transmitted. The image created in this manner on the screen of the monitor is conducted by means of a deviating prism 32 and an objective lens 33 to a beam splitter 34. The latter reflects the beam containing the monitor image to the pentagonal prism 15, which directs it into the image plane to be viewed by means of ocular lens 17 and eyepiece 18.

It is further possible to superpose the image of an object to be observed projected by the daylight visual observation device and a thermal image of the same object upon each other in the ocular lens 17. This is because both the visual image and the heat image may be directed by the pentagonal prism 15 together into the image plane viewed through the ocular lens 17.

It is also possible to superpose the visual image and the thermal image by means of a conventional television camera with an electronic mixing device. In the process, the visual image and the thermal image of the object to be observed are produced in the aforedescribed manner, received by television camera 35 via the pentagonal prism 15 and the beam splitter 19 and displayed on a screen, not shown.

It is possible still further to have the television camera 35 convert the images produced by the daylight observation device into electrical signals and transmit them to a monitor located in the novel panoramic apparatus, but not shown herein. Simultaneously, the electrical, television-compatible CCIR signals produced by the IR scanner system 24 may be transmitted to the monitor and a thermal image may be generated in this manner. It is merely necessary to ensure that both images are produced in identical scales of enlargement.

The tube 2 of the panoramic view apparatus of the invention may additionally be equipped with an active ranging system. In the illustrated embodiment, this consists of a $CO_2$ laser emitter 36, which is arranged in tube 2 at the left of FIG. 1. Its radiation passes over the mirrors 37 and 38 to the lookout mirror 8 and is directed from there to the object to be measured. The radiation reflected by the object is received by the lookout mirror 8, deflected and transmitted by means of the mirrors 39 and 40 to a receiver 41 (FIG. 2) in which electrical signals produced from the reflected radiation are evaluated by conventional techniques to determine the distance of the object.

Figure 2:
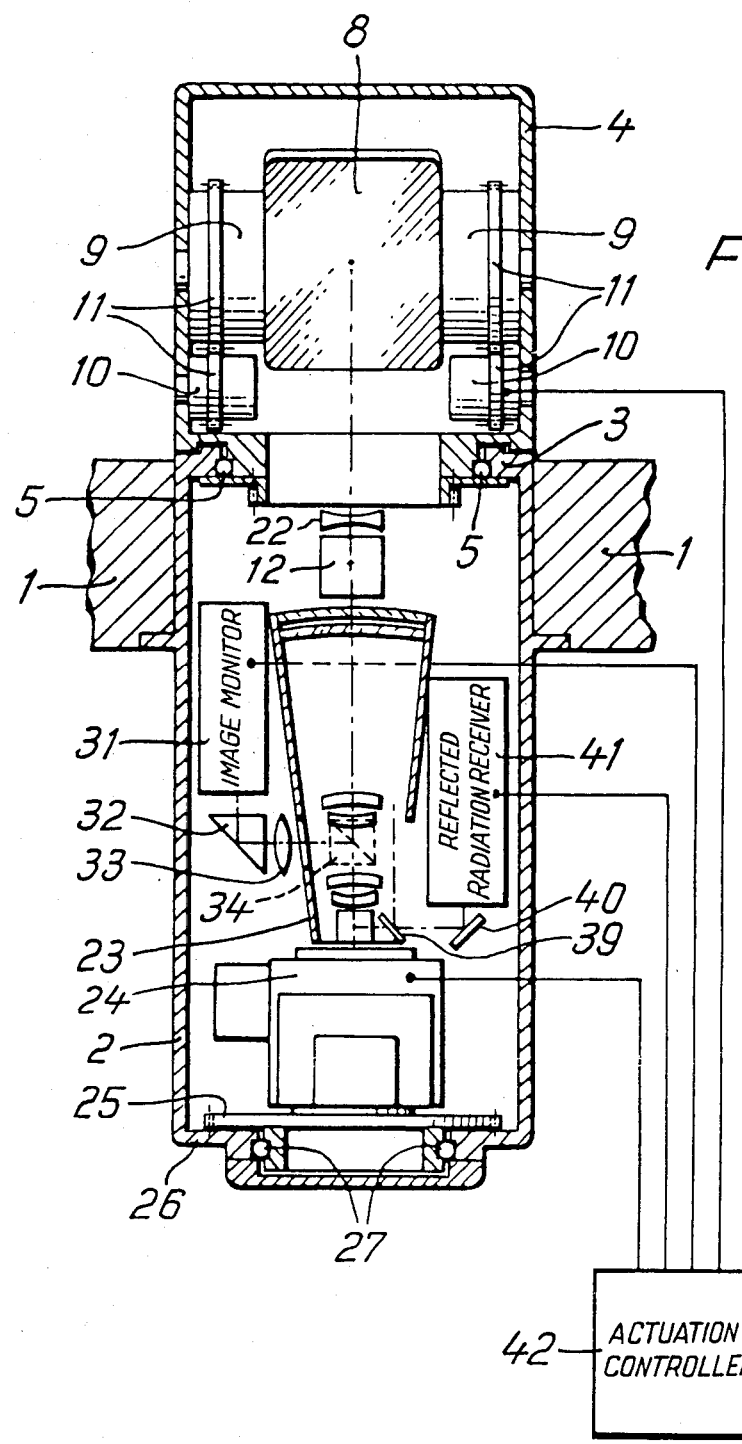
FIG. 2 is a sectional front elevation of the device.

As indicated schematically in FIG. 2, a computer unit 42 is associated with the panoramic view apparatus of the invention for actuating and deactivating the individual measuring and observation devices in controlled fashion.

Preferably, an electronic circuit layout 43 is associated with the panoramic view apparatus of the invention, which is capable of analyzing the signals originating in the measuring and observation devices. It may be used, for example, to analyze the electrical signals derived from the IR scanner system 24 of the night viewing device, which are produced from the different radiation intensities of the thermal image to determine whether the radiation in question is originating in an organic or inorganic substance.

The foregoing description has been set forth merely to illustrate the invention and is not intended to be limiting. Since modifications of the specifically described embodiments incorporating the spirit and substance of the invention may occur to persons skilled in the art, the scope of the invention is to be limited solely with respect to the following claims and equivalents.

I claim:

1. A panoramic view apparatus comprising a tube, a lookout mirror located in said tube and movable in elevation and azimuth, a bi-spectrally transparent closure window, at least three different measuring and observation devices arranged adjacent each other in said tube, and means for directing the output and input radiation for the measuring and observation devices parallelly through said closure window wherein at least one of the observation devices operates in an opto-electronic manner and further comprising means for assuring that upright and laterally correct images of the object to be observed are projected on a receiving part of said observation means independently of the azimuthal position of the closure window.

2. A panoramic view apparatus according to claim 1, wherein at least one of said observation devices comprises a television camera.

3. A panoramic view apparatus according to claim 1, further comprising means for selectively actuating and deactivating said measuring and observation devices.

4. A panoramic view apparatus according to claim 1, further comprising electronic means associated therewith for analyzing electrical signals issuing from different measuring and observation devices.

5. A panoramic view apparatus according to claim 1, further comprising a carrier arranged in said tube so as to be rotatable around the azimuthal axis, said carrier supporting a receiving part of a measuring device.

6. A panoramic view apparatus according to claim 5, further comprising means for coupling the rotation of said carrier with the azimuth movement of the lookout mirror.

7. A panoramic view apparatus according to claim 1, further comprising means for selectively superposing images produced by different measuring and observation devices.

8. A panoramic view apparatus according to claim 7, wherein images produced by different observation devices may be intermixed in an eyepiece of a daylight visual observation device.

9. A panoramic view apparatus according to claim 7, wherein an electronic mixing device is provided for intermixing the image of a television camera with an image produced by another opto-electronic observation device.

* * * * *